United States Patent [19]

Nakazawa et al.

[11] 4,066,568
[45] Jan. 3, 1978

[54] METHOD OF PRODUCING MICROCAPSULES

[75] Inventors: Atushi Nakazawa; Muneichi Ono, both of Yonago, Japan

[73] Assignee: Nippon Pulp Industry Company Limited, Tokyo, Japan

[21] Appl. No.: 710,104

[22] Filed: July 30, 1976

[30] Foreign Application Priority Data

Aug. 7, 1975 Japan .................................. 50-95433
May 27, 1976 Japan .................................. 51-060653

[51] Int. Cl.$^2$ ............................................ B01J 13/02
[52] U.S. Cl. .................................... 252/316; 282/27.5; 424/37; 427/151; 428/307; 428/913; 428/914
[58] Field of Search .......................... 252/316; 424/37; 428/307

[56] References Cited

U.S. PATENT DOCUMENTS

| | | | |
|---|---|---|---|
| 2,986,477 | 5/1961 | Eichel | 428/307 |
| 3,565,247 | 2/1971 | Brochman | 428/307 X |
| 3,769,062 | 10/1973 | Ishige et al. | 428/307 |
| 3,950,600 | 4/1976 | Knirsch et al. | 428/913 X |

OTHER PUBLICATIONS

Condensed Chemical Dictionary, 8th Edition, Revised by Hawley, Van Nostrand Reinhold Co., New York, 1971, p. 693.

Primary Examiner—Richard D. Lovering
Attorney, Agent, or Firm—Browdy and Neimark

[57] ABSTRACT

Microcapsules are produced by dispersing and emulsifying hydrophobic material such as water insoluble material, color forming material, color forming assistant, oil and mixture of oil and various medicines dissolved therein in gelatin aqueous solution so as to produce minute particles, adding coacervate forming agent composed of phytic acid and/or its salt to the above system to form gelatin and coacervate on the surface of minute cores of the hydrophobic material thereby forming coating film thereon into capsule form.

9 Claims, No Drawings

METHOD OF PRODUCING MICROCAPSULES

FIELD OF THE INVENTION

The present invention relates to a method of producing microcapsules by use of gelatin aqueous solution, and particularly to a method of producing microcapsules by use of phytic acid and/or its alkali metal salt or alkaline earth metal salt as coacervate forming agent.

The present invention also relates to products, for example, material for non-carbon paper, material for pressure-sensitive adhesives, heat-sensitive recording material and so forth, which utilize microcapsules obtained by said novel producing method.

BACKGROUND OF THE INVENTION

Generally, relating to the phase separation due to coacervation, there have been well known salt coacervation, simple coacervation and complex coacervation effecting phase separation into two phases of thick phase and weak phase obtained by mixing colloidal aqueous solutions more than two kinds having opposite electric charges by adjustment of pH, and this coacervate of thick colloidal phase can be utilized as wall film of microcapsules. That is to say, if at the time of production of coacervate, water insoluble material such as oil droplets and solid powder previously coexisted in this system, coacervate is produced using these particles as cores, and thereby microcapsules can be obtained. Such a capsule producing technique has a wide area of use according to materials packed in the capsules, and therefore studies have been made about production of non-carbon paper as well as applications to recording material, medical supplies, spices, agricultural medicines, chemical synthetic products, adhesives, liquid crystal paint, foodstuffs, cleaning material, dyestuffs, solvent, catalyst, enzyme, rust proofing material and so forth, and these have practically been used.

Heretofore, as polycation of hydrophilic colloidal material having ionized group of capsule raw material in complex coacervation of this aqueous solution system, acid treated gelatin, i.e. gelatin having an isoelectric point of 8 to 9 plays a central part, and as a polyanion capable of forming gelatin and coacervate, there are gum arabic, sodium alginate, agar, carboxymethylcellulose (CMC), and also copolymers of synthetic organic compounds, such as poly (styrene-maleic anhydride), poly (ethylene-maleic anhydride) and poly (vinylmethylether-maleic anhydride) and so forth can be used. However these copolymers are remarkably different from gum arabic etc. in their characteristics, and in general have too large a hydrophobic property and are easy to aggregate together, and accordingly when contacting with gelatine it is easy to produce an insoluble massive precipitate rather than coacervate, and therefore they are suitable to form large-sized tough capsules but unsuitable to microcapsules.

In addition, there has been known a method of causing the phase separation from the mixed aqueous solution of gelatin and polyvinyl alcohol, however this is not practical, and at present a method of producing microcapsules by complex coacervation of the combination of acid treated gelatin and gum arabic is considered best and has been utilized most widely.

However, in order to obtain practical fine capsules by producing coacervate from a mixed aqueous solution of this gelatin-gum arabic, there are some problems such as:

1. It is necessary to use gelatin and gum arabic in the same concentration and amount; (2) A large capsule producing arrangement is required because of the necessity for a of dilute solution of a concentration of aqueous solution lower than 3%, (3) Amount of hydrophobic material usually used is optimum when it is double parts by weight of the wall film colloidal material, and a large amount of oil cannot be capsuled effectively; (4) Operations of capsule forming steps are complicated; (5) The wall film is molecularly porous, and has such a permeability that the content (i.e. oil) of low molecular liquid material permeates therethrough at a higher temperature; (6) It is required to use acid treated gelatin having a pH of isoelectric point of 8 to 9.

Moreover, since the capsules are obtained in the dispersed dilute condition, said dispersion liquid must be further concentrated at the time of practical application of such capsules.

SUMMARY OF THE INVENTION

The present invention has been attained as a result of studies concerning the elimination of the various drawbacks in the production of microcapsules such as explained above, and as a result of the studies, a small amount of phytic acid or its metal salt was added to gelatin aqueous solution and thereby it was found that in a given pH range, its solution became white turbid and phase separation was caused, and as a result of the application of this group to the capsule forming, it was confirmed that this was a microcapsule forming method having more excellent characteristics than the capsule forming in the system of gelatin-gum arabic and it was found that this method could effectively produce superior fine capsules and thus the present invention has been reached.

Also, two-constituent color development system heat-sensitive material has been developed, said material being composed of a phenol-nature compound which is electron receptive on a single supporting body and color development coloring matter which is of an electron giving-nature, and the main application of such a heat sensitive material is for recording sheets for thermal printers and thermal recorders. However, the heat sensitive recording sheet of this kind was very sensitive not only to heating, but also to scratch friction thereby causing color development, namely there was a property of pressure color development, and also there was a large influence to humidity, and there was a difficulty such as fading after color development by moisture and its sunlight-resistance toughness was inferior.

In order to solve such drawbacks, a method using a color developing agent formed in capsule shape has been developed. Namely, Japanese Patent Application Publication No. 15227/74 discloses a method of making a heat-sensitive recording sheet by using an electron reaction system color developing agent and an ion reaction system color developing agent which causes color development by presence of water, however in this method the electron giving material (for example, crystal violet lactone), is, as in the case of a pressure sensitive recording sheet, only such that liquid drops dissolved and emulsion dispersed in non-volatile oil are formed into capsules, and the drawbacks described above, particularly lack of preservation property have not been scarcely improved.

The inventors of the present invention have studied hard to remove these difficulties, and as a result found that the preservation property and weather resistance are quite improved by capsule forming with both or either one of the constituents constituting the color developing system. At the same time a novel method of producing microcapsules by use of phytic acid, which is another object of the present invention and the outline of which is described as above, has been found quite preferable not only for the production of microcapsules including oily liquid, but also for capsule forming of the color developing constituent as being in powder form, and on the basis of this new knowledge, the present invention relating to heat sensitive recording material has been completed.

Accordingly, an object of the present invention is to provide a novel method which is superior to the microcapsule forming method in gelatin-gum arabic system.

Another object of the present invention is to produce non-carbon paper, pressure sensitive adhesives and other products of good quality effectively by the use of said novel microcapsule forming method.

DESCRIPTION OF PREFERRED EMBODIMENTS

The present invention relates to a method of producing microcapsules wherein particles of hydrophobic liquid and water insoluble materials which are emulsified into minute droplets in water are coated, and phytic acid used in the present invention is a material also called inositol hexaphosphoric acid and myoinositol hexaphosphoric acid etc., and obtained from phytin contained in seeds of plants in quantities by desalting treatment. The phytic acid salt used in the present invention may be such a one wherein a part of a phosphoric acid ester (there are twelve OH groups in the constructional formula by ANDERSON: R. J. Anderson, Journal of Biological Chemistry, Vol. 17, 141, 165, 1914) included in phytic acid is left as acid, and concretely single salt and double salt of equivalents of 1 to 10 are used. As the salt, alkali metals such as sodium and potassium etc. and alkaline earth metals such as magnesium and calcium etc. are economically preferred, however it is not limited to those. In the use of phytic acid and its salt, it may be the acid alone or the salt alone or the mixture thereof. In the present invention, a water insoluble material is a dispersion emulsified in a gelatin aqueous solution, and a small amount of phytic acid or its metal salt of 10 to 20% by weight to total dry amount of gelatin is mixed in said emulsion liquid thereby automatically adjusting to the optimum phase separation condition, and thus the thick phase due to its phase separation is produced on the cores of the water insoluble material, wrapping the cores and being deposited thereon to form a capsule film of gelatin rich composition. Practical microcapsules can be obtained by hardening said capsule film. Accordingly, the characteristics of the present invention are such that when the addition amount of phytic acid or its metal salt is small, effective phase separation is caused, and since its thick phase is of gelatin rich composition, capsule forming ability is high and sufficient capsule forming is capable by using a small amount of the wall film material, and a ratio of oil amount of core material to wall film material can be greatly increased, and microcapsules of high strength and having seamless wall film can be obtained. Amount of oil enabling capsule forming is ten times that of colloidal wall film material or more, and accordingly the present invention is very efficient as a method of producing microcapsules.

In the present invention, as gelatin, various gelatins such as acid treated gelatin, and alkali treated gelatin etc. and its derivatives can be used, and a small amount of addition of phytic acid and its salt to said gelatin causes very effective phase separation, and the range of addition is below 0.2g, preferably 0.1 to 0.2g per 1g of gelatin. This aqueous solution of phytic acid and its salts is acidic, and can be automatically adjusted to a pH in which the pH of the system causes the optimum phase separation, and this optimum pH for its phase separation is in a range of 3–4 depending on phytic acid or its salt. This pH range is the same in both cases of using any one of acid treated gelatin and alkali treated gelatin. It is necessary to keep the concentration of the aqueous solution system gelatin at 3%, however thick liquid can be used with respect to the concentration at the time of addition of phytic acid or its salt, and accordingly, capsules can be formed at a higher concentration and by a smaller liquid amount compared with the microcapsule forming method by gelatin-gum arabic system, and this is one of the characteristics of the present invention. In addition, as described above, it is possible to greatly reduce the capacity of the arrangement at the time of production because oil in an amount of high ratio to the colloidal wall film material can be formed into capsules.

One of the main uses of the microcapsules made by the present invention is the production of a recording paper of transcription type or self-contained type called pressure sensitive copying paper or non-carbon copying paper. In this case, recently as the water insoluble material, an oil of the aromatic hydrocarbon system, such as alkyl naphthalene system or diallyl alkane system is used, and such a solution is used that in this oil, crystal violet, methylene blue, malachite green or other colorless dye of leuco body of triphenylmethane system is dissolved. As the final step hardening treatment of microcapsule forming, well known means can be adopted, such as the use of a hardening agent such as formalin, glutaraldehyde, and other aldehyde group, tannic acid, alum, carboxylic acid and so on, or radiation of radiant ray and heat ray and the like.

Thus, the capsules obtained by the present invention, when using as the paint liquid of a pressure sensitive copying paper, can be used as it is because, as mentioned above, the capsules are obtained as a thick dispersion liquid, and when dry capsules are required, they can be obtained by separating the capsules by filtration or centrifugal separation and thereafter drying them by vacuum drying and the like.

Moreover, the present invention relates to heat sensitive recording material using a two-constituent color development system of phenol nature compound and electron-giving color development material which is generally colorless or of a light color and causes color development by reaction with said phenol nature compound, and to a method of producing the same, and provides superior heat sensitive recording material which has improved color development by pressure and friction, improved water resisting properties and weather resistance etc. by making a minute powder of both or one of said two-constituent color development system materials into microcapsule, these properties being difficulties of the prior art heat sensitive recording sheets. As mentioned above, the microcapsule forming method of the present invention is novel, and characterized by the addition of a small amount of phytic acid or its metal salt as polyanion, which is superior in microcapsule forming of minute dispersion particles of solid, and in this method, adjustment of thickness of wall film and adjustment of need of hardening treatment or hardness can be attained due to very effective capsule forming ability of said phytic acid or its metal salt.

The Phenol nature compound used in the present invention is preferably one that is liquified or gasified at a temperature above the normal temperature, preferably above 70° C and reacts with the color development dye to cause color development, and typically the following can be listed: 4,4'-isopropylidenediphenol (bisphenol A), 4,4'-isopropylindenebis (2-chlorophenol), 4,4'-isopylidenebis (2-methyl-phenol), 4,4'-isopropylidenebis (2,1-tert-butylphenol), 4,4'-sec-butylidenephenol, 4,4'-cyclohexilidenediphenol, 4-tert-butylphenol, 4-phenylphenol, 4-hydroxydiphenoxide, naphthol, β-naphthol, methyl-4-hydroxybenzoate, 4-hydroxy-acetophenone, salicylic acid anilide, novolak type phenol resin, and halogenation-novolak type phenol resin etc., however these are typical ones, and the present invention should not be limited only to these. Among these materials, phenol compounds having more than one phenol group in their molecule are used preferably.

As a color developing dye used in the present invention which is colorless or light colored and causes color development by the reaction with the phenol compound, the following can be listed: 3,3-bis (paradimethylaminophenyl)-6-dimethyl-aminophthalide (crystal violet lactone), 3,3-bis (paradibutylaminophenol) phthalide (malachite green lactone), 3,3-bis (paradimethylaminophenyl) phthalide, 1-amino-3,6,7-trimethylfluorene, 3-diethylamino-7-dibenzylaminofluorene, 3-diethylamino-7-(N-methylanilino) fluorene, 3-dimethylamino-6-methoxyfluorene, 3-dibutylamino-6-methyl-7-chlorofluorene, 3-moruhorino-5,6-benzofluorene and so on, however the dyes are not limited to those.

As the support body used in the present invention, paper is generally used, however synthetic resin film, laminated paper, and woven cloth etc. can also be used.

As an addition agent, for improvement of paint aptitude, adjustment of sensitivity of color development, and prevention of adhesion to heating head or prevention of refuse adhesion, it is possible to add a filler such as talc, clay and starch, and an interfacial activator such as a suitable foam extinguishing agent, dispersion agent (the coacervate forming agent mentioned above), and repelling preventing agent etc., and wax into the dispersion liquid.

The hydrophobic minute powder is produced by dispersing the phenol nature compound and/or color development material together with a suitable dispersion agent in a ball mill or the like, and gelatin aqueous solution and phytic acid are added thereto and after agitation thereof microcapsules are formed, and then these microcapsules are hardened and set. As the dispersion agent, water soluble macro-molecular materials, for example, gum arabic and PVA etc. can be used.

As evident from the above, advantages of the present invention are such that the drawbacks of the prior art capsule forming technique described above are greatly improved, for example, in the process of capsule forming, pH can be automatically adjusted, so that acid and alkali are not required to be used and therefore the process can be simplified, and capsule forming can be effected efficiently by a small amount of a wall film material, and as a result, reduction of cost, and saving of energy can be attained, and in a smaller arrangement, a large quantity of capsules of good dispersion property can be produced, and since the wall films thereof are of gelatin rich composition, they are superior in their strength and impermeability, and a concentration process in unnecessary, and thus the present invention is very worthy industrially.

Using the microcapsule forming method as mentioned above, preservation quality, chemical resistance and solvent resistance of heat sensitive records are improved by forming both or one of the single-constituent heat sensitive materials, namely the basic dye and the phenol nature compound into a capsule, as well as the color development temperature, namely the melting point of the heat sensitive color development material can be adjusted by thickness and hardness of the capsule wall film as mentioned above, and also the standing up velocity of optical color development characteristic curve can be improved.

Particularly, the present invention has succeeded to form minute powder of color development system material directly into capsules and in this respect fundamentally differs from the prior art method wherein said material in dissolved in non-volatile oil and emulsion dispersed liquid drops are turned into capsules. Accordingly, the heat sensitive paper obtained according to the present invention shows the superior property of preventing pressure color development in single step painting treatment without painting polyethylene, polypropylene and the like as protecting layer for preventing pressure color development on the heat sensitive recording layer, and allows water paint to be painted and also shows the white appearance of natural paper feeling.

Examples of the present invention will be described hereinafter, however it is to be understood that the present invention is not limited to these and changes and modifications may be made without departing from the scope of the invention as defined by the claims.

EXAMPLE 1

20g of acid treated gelatin (isoelectric point 8.8) was added to 220g of water, and left as it was for 1 hour, and thereafter heated so as to dissolve at 60° C. On the other hand, 2.5g of crystal violet lactone and 1.5g of benzoyl-leucomethyleneblue were dissolved in 30g of kerosene and 100g of high boiling point aromatic hydrocarbon compound by heating at 60° C, and then this was added to said gelatin solution and also 10g of 4% caustic soda aqueous solution was added thereto, and this was agitated so as to cause an emulsion dispersion of oil drops of an average grain size of 1–3μ, and 400g of dilution warm water was added to said emulsion as it was agitated, and then 32g of 10% phytic acid aqueous solution was dropped therein, and it was confirmed that the pH was 3.5. In this stage, the phase separation was caused, and the thick phase thereof was deposited around the oil drops. The mixture liquid was further cooled to 10° C. Next 15cc of 25% glutaraldehyde was added thereto and the agitation is continued for about 5 hours. The pH of the system was adjusted to 10.0 by 5% NaOH aqueous solution. The dispersion liquid of oil including capsules thus obtained had moderate fluidity and viscocity as a paint liquid for pressure sensitive copying paper, and it could be directly used as the painting treatment. These microcapsules include scarcely any clusters as a result of microscopic observation. The capsule dispersion liquid thus obtained was painted and dried on a raw paper surface of 45g/m2 so as to become 6g/m2 by dry weight. This paper was overlapped to a reception paper having a principal component of acid clay and novolak type phenol resin so as to be opposed to the reception paper surface, and copying was performed on a plurality of such papers, and as a result clear color development images were obtained on both reception papers. Moreover, this painted paper was left for 20 hours at 105° C, and thereafter color development was caused, however the concentration of the image was the same as that before the heating treatment. Also, the painted paper was overlapped onto the reception paper surface so as to be opposite to each other and subjected to a pressure of 5kg/cm2 in an atmosphere of 60% RH and 25° C and left for 1 hour as it was, however any dirt due to break of the capsules was scarcely recognized.

EXAMPLE 2

2 parts by weight of sodium carbonate and 20 parts by weight of addition water were added to 10 parts by weight of 50% phytic acid aqueous solution and the resultant mixture was agitated until the production of bubbles was disappeared, thereby preparing phytin-5 sodium salt.

Like the example 1, dispersion emulsion liquid of high boiling point alkyl naphthalene system hydrocarbon compound including leuco body of pressure sensitive dye and lactone and 5% solution of acid treated gelatin (isoelectric point 8.8) was made, and the phytin-5 sodium salt of about 18cc prepared as above was gradually dropped so that pH became 3.5, and subsequently water was added to dilute the gelatin concentration to 3% thereby causing the phase separation. Next, the hardening treatment like the example 1 was carried out, and thereafter pH was adjusted to 10, with the result that microcapsules for pressure sensitive copying paper having wall film of superior capsule strength and impermeability were obtained.

EXAMPLE 3

As gelatin, alkali treated gelatin (isoelectric point 4.3) was used, and about 3.4g of 10% phytic acid aqueous solution was dropped in so as to adjust pH to 3.6 thereby causing the phase separation, and except for the above, the step like the example 1 was carried out thereby producing the paint liquid for pressure sensitive copying paper. The quality characteristics of the pressure sensitive paper painted with this capsules was superior like the microcapsules of the example 1.

EXAMPLE 4

Except for using alkali treated gelatin (isoelectric point 4.3) as gelatin, the step like the example 2 was carried thereby producing microcapsules forming moderate clusters superior as pressure sensitive copying paper.

EXAMPLE 5

200cc of 3% acid treated gelatin (isoelectric point 8.8) aqueous solution was heated to 50° C. On the other hand, a pressure sensitive adhesive composition was prepared which was composed of 450g of toluene, 50g of polyisobutylene (average molecular weight: 90,000), 25g of terpene system thermoplastic resin (melting point: 115° C) and 20g of mineral oil. 40g of this adhesive solution was added to said gelatin solution and emulsion dispersed by means of a homogenizing mixer. The resultant emulsion was added with 2.7ml of phytic acid-5 sodium salt solution prepared in the example 3 so as to adjust pH to 3.5 while agitating the emulsion. In this step, the phase separation was caused, and the coacervate rich in gelatin content was deposited around the adhesive oil drops. Subsequently this mixture liquid was cooled, and added with 5cc of 25% glutaraldehyde solution thereby effecting the hardening treatment for about 3 hours at room temperature, and as a result the microcapsules were obtained. The painted paper of these capsules was non-adhesive, however, when the capsules were broken by heat and pressure, it showed good adhesive property to the surface of paper wood, metal, plastic film and so on.

EXAMPLE 6

A. Forming of microcapsules of basic color development dye 40g of 10% gum arabic aqueous solution was added to 20g of crystal violet (CVL) and the resultant mixture was ground and dispersed by a ball mill for 10 hours. The resultant dispersion liquid was heated at 50° C, and 300g of 5% aqueous solution of acid treated gelatin having isoelectric point 8.8 prepared by heating and dissolving was added to said dispersion liquid. The mixture liquid was sufficiently agitated, and thereafter was drop added with 7ml of 15% phytic acid sodium thereby adjusting pH to 4.0. Continuing the agitation, the container was cooled from the outside to maintain it at 10° C and thus the coacervate produced around the minute powder body of CVL was gelation fixed. When the liquid temperature was 10° C, 10cc of 25% glutaraldehyde was drop added and the agitation was continuing for 12 hours thereby causing hardening of the wall film, and thus the capsule slurry liquid was obtained.

B. Preparing of dispersion liquid of phenol compound.

100g of 10% gum arabic aqueous solution was added to 50g of 4.4'-isopropylidenediphenol (bisphenol A), and crushed by means of a ball mill for 10 hours thereby causing dispersion thereof.

Then, A and B dispersion liquids were mixed to make heat sensitive recording paint liquid. Said paint liquid was applied on a usual paper of an amount of 50g/m2 so that the application amount after drying became about 5g/m2, thereby obtaining heat sensitive recording sheets.

Also, in capsule forming of A liquid, in relation to the capsule slurry liquid which was produced by cooling the coacervate at 10° C thereby causing gelatin fixation and thereafter omitting hardening treatment by glutaraldehyde, heat sensitive recording sheet was obtained by mixing with B liquid in the same manner.

For the comparison, the following experiments were carried out. Instead of A liquid, CVL dispersion liquid, C liquid was prepared as below, and by mixing with B liquid, heat sensitive recording paper was obtained in the same manner.

C. Basic color developing dye 100g of 10% polyvinylalcohol aqueous solution and 100g of water were added to 20g of CVL and crushed by means of a ball mill for 20 hours thereby causing dispersion thereof.

The results about preservation property, and color development property of three kinds of heat sensitive recording papers thus obtained are shown in Table 1.

Table 1

| | Friction resistance | Water resisting property | Light resistance | Color development temperature (° C) |
|---|---|---|---|---|
| Capsule formed product (Hardening treatment agent) | ⊚ | ⊚ | ⊚ | 120° |
| Capsule formed product (without hardening treatment) | ⊚ | ○ | ○ | 110° |
| Non-capsule formed product | X | X | X | 100° |

Note:
⊚ :Very good
○ : Good
△: Slightly bad
X : Bad

Friction resistance: Load of 2kg is applied on gum plate of 5cm diameter and stretching is done at a constant speed (6 inch/min.)

Water resisting property: Fuedo meter treatment for 6 hours.

Light resistance: 40° C, 90% RH 24 hours treatment

Color development temperature: Temperature required for optical density (reflection concentration becoming 0.8)

EXAMPLE 7

Capsule forming was carried out by using the same amount of polyvinylalcohol instead of gum arabic used as CVL dispersion agent of Example 6 in the same manner as Example 6, and as hardening agent, 2ml of 25% glutaraldehyde was added in one case, and in another case it was added 4ml, and such two kinds of CVL capsules were used to obtain two kinds of heat sensitive recording papers in the same manner as Example 6. In the quality tests thereof, they showed superior preservation property, and gave clear, sharp, blue color development characters. Relating to its color development characteristics, in the case the hardening agent was smaller amount, color development was caused at lower temperature.

EXAMPLE 8

Capsules were obtained by the same manner as Example 2 except for using of amount of CVL of two times as much as that used in Example 6, and using such obtained capsules, heat sensitive recording papers were produced. In this case, the wall film was thinner than that of Example 6, however said papers showed superior preservation property and in relation to its color development temperature, good sensitivity was shown.

EXAMPLE 9

CVL capsule forming method used in Example 6 was adapted to bisphenol A, and the two constituents of the heat sensitive color development material were separately capsule formed, and then mixed together.

Volume ratio of the two constituents and all other conditions were the same as those of Example 6, and thereby heat sensitive recording papers were obtained. As a result, the recording papers which were very superior in preservation property and weather resistance and had higher color development temperature were obtained.

What is claimed is:

1. In a method of producing microcapsules in which hydrophobic material, namely water insoluble powder or oil or oil with a material dissolved therein, is dissolved in gelatin aqueous solution, thereby causing a dispersion emulsion and forming minute particles, and gelatin and coacervate are formed on the surface of the minute cores of the hydrophobic material by adding coacervate forming agent to this system, thereby forming a capsule like film, the improvement wherein a phase is formed which is thick in gelatin by adding phytic acid and/or alkali metal salt or alkaline earth metal salt as said coacervate forming agent, thereby forming capsules around said hydrophobic material cores.

2. Method as claimed in claim 1, wherein a water insoluble powder, dispersion agent and/or additional wall film forming material are added.

3. Method as claimed in claim 1, wherein said hydrophobic material is color developing material having an electron giving property which is normally colorless or of a light color and/or an electron giving material selected from the group consisting of a phenol compound, an organic acid and their polymers which allow said color developing material to color develop when heated.

4. Method as claimed in claim 1, wherein the amount of phytic acid and/or its salts used is below 0.2g per 1g of gelatin.

5. Method as claimed in claim 1, wherein said gelatin aqueous solution is an aqueous solution of acid or alkali treated gelatin.

6. Method as claimed in claim 1, wherein as said hydrophobic material, benzoylleucomethyleneblue and crystal violet lactone are used which are pressure sensitive dyes.

7. Method as claimed in claim 1, wherein as said hydrophobic material, polyisobutylene and terpene system thermoplastic resin are used which are pressure sensitive adhesives.

8. Method as claimed in claim 1, wherein as hydrophobic material, basic color development dye composed of crystal violet lactone and/or phenol nature material composed of 4,4'-isopropylidenediphenol are used.

9. In a method of producing microcapsules in which hydrophobic material, namely water insoluble powder or oil or oil with a material dissolved therein is encapsulated, comprising forming a dispersion emulsion of said hydrophobic material in an aqueous solution of polycation and forming a coacervate by adding a polyanion and acid, the improvement wherein said polycation is gelatin and said polyanion and said acid both consist essentially of phytic acid and/or the alkali metal or alkaline earth metal salt thereof.

* * * * *